Patented May 25, 1943

2,320,009

UNITED STATES PATENT OFFICE 2,320,009

INORGANIC PLASTIC PRODUCT AND PROCESS OF PREPARING THE SAME

Anderson W. Ralston and Everett J. Hoffman, Chicago, Ill., assignors to Armour and Company, Chicago, Ill., a corporation of Illinois No Drawing. Application March 29, 1939,
Serial No. 264,850

3 Claims. (Cl. 106—72)

This invention relates to inorganic plastic products and processes of preparing the same, and it comprises inorganic materials, such as clays, limes, cements, and plasters, which are commonly admixed with water prior to forming products of permanent shape therefrom, said materials containing, as a plasticity-imparting agent, small amounts of primary aliphatic amines, or salts thereof, containing ten or more carbon atoms.

It further comprises processes wherein such inorganic materials are admixed with such amines or amine salts, in order to improve the plasticity of such products when admixed with water.

In the manufacture of products from ceramic clays, cement, plaster, lime and the like, it is common to first admix these materials with water to form an aqueous mass which can be molded into the desired shape the final article is to take, or to prepare aqueous slurries which can be spread on wall surfaces, roadways, between paper liners in making plaster board, and the like. The aqueous slurries or suspensions of such materials should have good plastic properties. In ceramic clays, for example, it is desirable that the aqueous clay mixture be workable over a considerable range of water content. In limes used for plasters, the plaster should retain its water content for considerable periods of time in order to allow the aqueous mixture to be spread evenly and to insure a strong permanent set. The plasticity of aqueous mixtures of cementitious materials and clays appears to be associated in some way with the water-holding capacity of the inorganic constituent. A clay which has high plastic qualities is in great demand in the ceramic industry and such clays are frequently shipped over long distances because of the premium they command in this respect.

Limes which are high in magnesium content are superior to high calcium limes as regards plasticity, and here again the high magnesium limes sell at a premium and are in great demand. Such high magnesium limes are suitable for finishing plasters because their aqueous mixtures absorb and retain quite a lot of water but still give mixtures which have the desired workability or plasticity. In the manufacture of bricks, tiles and the like, from clays it is essential that the clay, when admixed with water, yield a mass which is sufficiently plastic to insure that articles prepared therefrom remain intact and do not crumble during the initial firing period. Similar considerations apply to ordinary cement. Many expedients are in use to prevent cement from drying too quickly. What is desired is a highly plastic aqueous mixture of the cement which can be formed into the desired shape, or spread on a roadway, but yet retains its water content for considerable periods of time to permit setting.

The problem is not solved merely by adding more water to the materials. A point is reached where the aqueous slurry becomes thinly fluid and cannot be worked or spread properly.

What is desired is some way of imparting plasticity to inorganic products of the nature specified whereby greater quantities of water are held by the mass yet it has the proper plasticity and workability.

We have now discovered that the plastic properties of such materials can be improved by the addition thereto of small amounts of aliphatic primary amines containing ten or more carbon atoms, or salts of such amines. Typical amines falling within the generic scope of our invention are decylamine, dodecylamine, hexadecyl and octadecylamine, or salts thereof, such as the hydrochloride and acetate. Only small amounts of such amines need be added. Quantities of the order of one-half to 1%, based on the weight of inorganic plastic material, are adequate.

When we apply our invention to the improvement of clays, we measure improvement by the amount of water necessary to produce certain consistencies. Briquettes are then made from such aqueous mixtures, the briquettes dried, and heated in a muffle furnace. When we apply our invention to limes we measure the amount of water necessary to give the desired consistency and then determine plasticity of the mixture by means of an Emley Plasticimeter. For products other than the clays, the Emley Plasticimeter offers a convenient way of measuring plasticity. This apparatus consists of a lower revolving plate and an upper stationary plate. The sample to be tested is placed upon a disc of absorbent ceramic material and inserted between the two plates. The lower plate rotates around a screw so that with each revolution the distance between the lower and the upper plate is decreased. The lower plate is attached by means of a pulley arrangement to a needle which indicates the resistance against turning. This scale is divided into ten units and the test is discontinued either when the needle reaches the tenth unit or when it falls back to the zero position. The latter indicates that the sample has separated from the absorbent disc. The time necessary for either of these possibilities to occur is recorded and the plasticity is calculated by means of the following empirical equation:

$$x = \sqrt{(10t)^2 + p^2}$$

wherein $x$ equals the plasticity, $t$ equals the time in minutes and $p$ equals ten times the scale reading.

We shall now give examples illustrating our invention:

Example 1

Five hundred grams of clay are mixed with two and one-half grams of dodecyl amine acetate. Five hundred and fifty grams of water are necessary to bring this clay mixture to a workable consistency. A portion of the sample is then molded into the form of a disc and after drying is fired in a muffle furnace for eight hours at 2250° F. The sample will not crack during this process and the product is a partially vitrified disc.

The same procedure is followed but omitting the dodecylamine acetate. Five hundred grams of the same clay require only four hundred grams of water to give a mass having the same workable consistency when no dodecylamine is added. But a disc molded from such a mixture and dried and fired begins to disintegrate at a temperature of 500° F.

Thus it is apparent that by the addition of the dodecylamine acetate the amount of water held by the clay is increased materially and no disintegration occurs during firing.

Example 2

Two and one-half grams of octadecyl amine acetate are added to five hundred grams of a high calcium lime and the mixture admixed with 500 grams of water. The plasticity is then determined by means of the Emley Plasticimeter described above and a scale reading of eight recorded after fifteen minutes. This gives a value of 170 for the plasticity. A sample of the same lime and the same amount of water but without the addition of the octadecyl amine acetate gave a value of 139.

Example 3

A sample of a high magnesium lime gives a plasticity value of 190 using the Emley Plasticimeter. The addition of one-half of one percent of dodecyl amine hydrochloride gives a plasticity value of 300 when tested on the Plasticimeter.

Example 4

A sample of cement is mixed in the dry state with 0.5% of dodecyl amine hydrochloride. The sample containing this amine takes up approximately ten percent more water than an untreated sample. It is noticeably easy to spread and its general properties are considerably improved.

Example 5

A sample of plaster of Paris weighing 200 grams is mixed with water until a workable consistency is obtained. The sample is then poured upon a glass plate and the time necessary for it to set to a hard solid is recorded. The sample requires 92 cc. of water to obtain the desired consistency and sets to a solid in 9 minutes after pouring upon the glass plate.

A similar sample is mixed with 0.5%, by weight of dodecyl amine acetate. This sample is then mixed with water as described above, poured upon the glass plate and the time necessary for it to set recorded. This sample requires 106 cc. of water and sets to a hard solid in 49 minutes.

A similar sample of plaster of Paris is mixed with 0.25% of dodecyl amine acetate and treated as above described. This sample requires 103 cc. of water to obtain the desired consistency and requires 42 minutes to set to a hard solid.

A similar sample of plaster of Paris is mixed with 0.1% of dodecyl amine acetate and treated as described above. This sample requires 98 cc. of water and sets to a hard solid in 40 minutes.

A similar sample of plaster of Paris is mixed with 0.5 of 1% of dodecyl amine. This sample requires 110 cc. of water to reach the desired consistency and sets to a hard solid in 48 minutes.

In order to compare the water holding capacity of the plaster of Paris-amine or amine salt mixtures with similar mixtures made without the addition of amines or amine salts, a sample of plaster of Paris weighing 200 grams is treated with 106 cc. of water which is the same amount necessary to impart a workable consistency to a sample containing one-half of 1% of dodecyl amine acetate. The mixture forms a soupy mass which is too liquid to be workable. It can be readily poured from the beaker whereas all of the other samples described above are semi-solids when poured onto the glass plate. The conclusion, therefore, is that the addition of the dodecyl amine or the dodecyl amine acetate has materially increased the plastic range, water holding capacity, and the time of setting of the plaster of Paris samples.

In the practise of our invention the manner of incorporating the amine or amine salt in the plastic material depends on the nature of the substance to which it is added. In the case of clays or cements it is satisfactory to simply mix the solid amine salt with the material and then add the water. When slaked lime is used the amine salt can either be mixed with the dry lime or dissolved in the slaking water and then be admixed with the lime.

Although we have limited our specific examples to the use of dodecyl amine or dodecyl amine salts, and octadecylamine salts it will be apparent that similar results are obtained when other amine or amine salts having ten or more carbon atoms are used. In many instances when we add the amine salt it reacts with alkaline constituents in the cement or lime to liberate free amine and in consequence, the water holding capacity in such instances is due to the presence of the amine rather than the amine salt. But both the amines and their salts are equally useful in our process. As a matter of convenience the amine salts are preferred but the amines themselves are operable to an equal extent.

The actual amount of amine or amine salt present can vary over wide limits, but one-half of 1% or thereabouts is almost always adequate. More than one-half of 1% is not ordinarily necessary to impart the desired plasticity to the final aqueous mixture.

Having thus described our invention what we claim is:

1. The process of improving the plasticity of aqueous mixtures prepared from clay which includes the step of incorporating therewith small amounts of a primary aliphatic amine compound chosen from the group consisting of primary aliphatic amines and salts thereof having at least ten carbon atoms in the alkyl radical.

2. The process as in claim 1 wherein the amine compound is a dodecylamine salt.

3. Clay containing a small amount of a primary aliphatic amine salt having from ten to eighteen carbon atoms.

ANDERSON W. RALSTON.
EVERETT J. HOFFMAN.